(12) United States Patent
Lau et al.

(10) Patent No.: US 9,154,013 B2
(45) Date of Patent: Oct. 6, 2015

(54) ELECTRIC MOTOR

(71) Applicant: Johnson Electric S.A., Murten (CH)

(72) Inventors: James Ching Sik Lau, Hong Kong (CN); Xiao Jun Yang, Shenzhen (CN); Cheong Wing Yuen, Hong Kong (CN); Yu Ying Li, Shenzhen (CN); Yang Qing Hou, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 13/786,024

(22) Filed: Mar. 5, 2013

(65) Prior Publication Data

US 2013/0229071 A1    Sep. 5, 2013

(30) Foreign Application Priority Data

Mar. 5, 2012   (CN) .......................... 2012 1 0055255

(51) Int. Cl.
*H02K 5/18*   (2006.01)
*H02K 5/12*   (2006.01)
*H02K 5/08*   (2006.01)
*H02K 9/22*   (2006.01)

(52) U.S. Cl.
CPC .. *H02K 5/18* (2013.01); *H02K 5/08* (2013.01); *H02K 9/22* (2013.01)

(58) Field of Classification Search
CPC ................................. H02K 5/08; H02K 15/12
USPC ....................................................... 310/43, 64
See application file for complete search history.

(56) References Cited

U.S. PATENT DOCUMENTS

| | | | | |
|---|---|---|---|---|
| 5,008,572 | A | * | 4/1991 | Marshall et al. ................. 310/45 |
| 5,925,947 | A | * | 7/1999 | Kajiwara et al. ................. 310/64 |
| 2007/0152523 | A1 | * | 7/2007 | Bookout .......................... 310/87 |
| 2008/0143203 | A1 | * | 6/2008 | Purvines et al. ................. 310/71 |
| 2010/0019586 | A1 | | 1/2010 | Lu |
| 2011/0278970 | A1 | | 11/2011 | Lau et al. |
| 2012/0043067 | A1 | * | 2/2012 | Huang .......................... 165/185 |

FOREIGN PATENT DOCUMENTS

| | | | |
|---|---|---|---|
| CN | 1700564 | 11/2005 | |
| CN | 201430475 | 3/2010 | |
| JP | 11299174 | * 10/1999 | ............... H02K 9/04 |

* cited by examiner

*Primary Examiner* — Terrance Kenerly
(74) *Attorney, Agent, or Firm* — Muncy, Geissler, Olds & Lowe, P.C.

(57) ABSTRACT

An electric motor has a stator, a shaft and a rotor. The stator has an annular yoke portion; a plurality of stator teeth inwardly extending from the yoke portion; stator windings wound on the stator teeth; and a molded member made of heat conductive plastic material. The molded member has a plurality of fins arranged on an outer wall of the yoke portion, a covering portion disposed in the spaces between adjacent stator teeth, and two connecting portions respectively located at axially outer end faces of the yoke portion and connected to the covering portion and the fins. The covering portion covers an inner wall of the yoke portion and the stator windings, and connects to the fins via the connecting portions. Heat generated by the stator windings is transmitted to the fins via the covering portion and the connecting portions, where it is dissipated.

17 Claims, 3 Drawing Sheets

ELECTRIC MOTOR

CROSS REFERENCE TO RELATED APPLICATIONS

This non-provisional patent application claims priority under 35 U.S.C. §119(a) from Patent Application No. 201210055255.9 filed in The People's Republic of China on Mar. 5, 2012.

FIELD OF THE INVENTION

This invention generally relates to an electric motor, and in particular to a motor with an over molded stator having good heat dissipation.

BACKGROUND OF THE INVENTION

A stator of an inner-rotor motor typically includes an annular yoke portion, a plurality of stator teeth extending from the yoke portion, and stator windings wound on the stator teeth. To improve heat dissipation, a plurality of axial projections is formed on the outside of the yoke portion, to increase the surface area of the stator exposed to the air. However, the projections usually have only a small axial length. An existing solution that further improves heat dissipation and maintains substantially same cost involves mounting metal fins on the outside of the stator wall. However, as the power of electrical appliances continues to increase, existing solutions for dissipating heat do not meet the requirements.

Thus there is a need for an electric motor having a stator with improved heat dissipation.

SUMMARY OF THE INVENTION

Accordingly, in one aspect thereof, the present invention provides an electric motor comprising a stator, a shaft, and a rotor received in the stator, the stator comprising: an annular yoke portion; a plurality of stator teeth inwardly extending from the yoke portion; stator windings wound on the stator teeth; and a molded member made of heat conductive plastic material, the molded member comprising: a plurality of fins arranged on an outer wall of the yoke portion, a covering portion disposed in spaces between adjacent stator teeth and covering the stator windings, and two connecting portions respectively located at two axial end faces of the yoke portion and connected to the covering portion and the fins.

Preferably, each connecting portion is ring shaped and completely covers the corresponding end face.

Preferably, a plurality of axially extending recesses is formed in a radially outer wall of the yoke portion; and each fin is axially arranged on the radially outer wall of the yoke portion, and a radially inner portion of each fin is received in a corresponding one of the recesses.

Preferably, each fin extends in the axial direction of the motor and extends beyond at least one of the two connecting portions.

Preferably, grooves are formed in axially outer surfaces of the two connecting portions.

Preferably, the molded member is integrally formed as a single piece, monolithic, injection molded structure.

Preferably, an impeller is fixed to the shaft and located at one end of the stator and the fins extend passed the corresponding connecting portion and radially surround the impeller.

Preferably, an end cap fixed to the stator and the impeller is located between one connecting portion and the end cap.

Preferably, two end caps fixed to the stator and the shaft is journalled in bearings supported by the two end caps.

Preferably, each tooth has a radially inner surface that faces the rotor and is arc shaped, the inner surface and the covering portion forming a circular cylindrical surface that defines a space accommodating the rotor.

According to a second aspect, the present invention provides a stator for an electric motor, comprising: an annular yoke portion; a plurality of stator teeth inwardly extending from the yoke portion; stator windings wound on the stator teeth; and an injection molded member made of electrically insulating, heat conductive plastic material, the molded member comprising: a plurality of fins arranged on an outer wall of the yoke portion, a covering portion disposed in spaces between adjacent stator teeth and covering the stator windings, and two connecting portions located at respective axially outer end faces of the yoke portion, and connected to the covering portion and the fins.

Compared to the prior art, the present invention has the following advantages:

(1) The covering portion made of heat conductive plastics material covers the inner wall of the yoke portion and the stator windings, and connects to the fins via the connecting portions. As such, heat generated by the stator windings is dissipated via the covering portion, the two connecting portions and the fins, so that heat dissipation is enhanced.

(2) The metal fins in prior art are replaced by the molded member made of electric insulating plastics material, to decrease the weight of the motor and reduce production costs.

(3) The stator is more reliable with reduced vulnerability to dust and corrosion.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
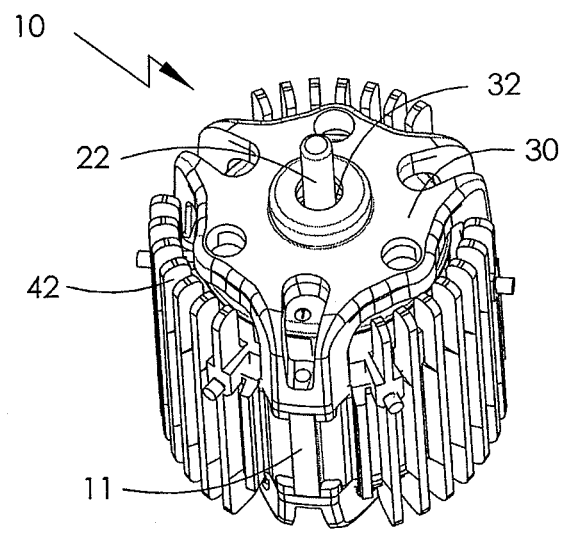
FIG. 1 is a view of a motor according to the preferred embodiment of the present invention.

A motor 10 according to an exemplary embodiment of the present invention comprises a stator 11, a rotor 20, a shaft 22 and two end caps 30. Each end cap 30 has a shaft hole 32 at its center portion. The rotor 20 is received in the stator 11. The two end caps 30 are fixed to respective axial ends of the stator 11, with the rotor shaft 22 of the rotor 20 passing through the two shaft holes 32 and being journalled in bearings held by the end caps.

Figure 4:
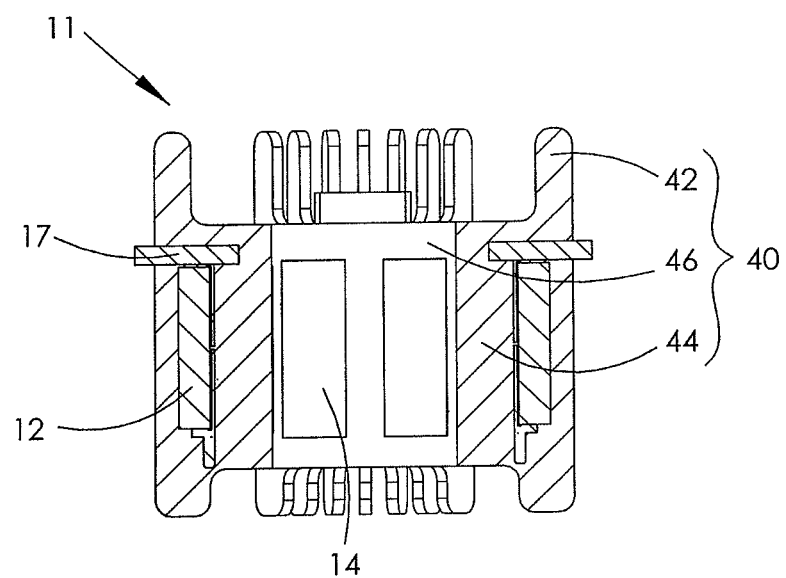
FIG. 4 is a sectional view of a stator, being a part of the motor of FIG. 1.
Figure 5:
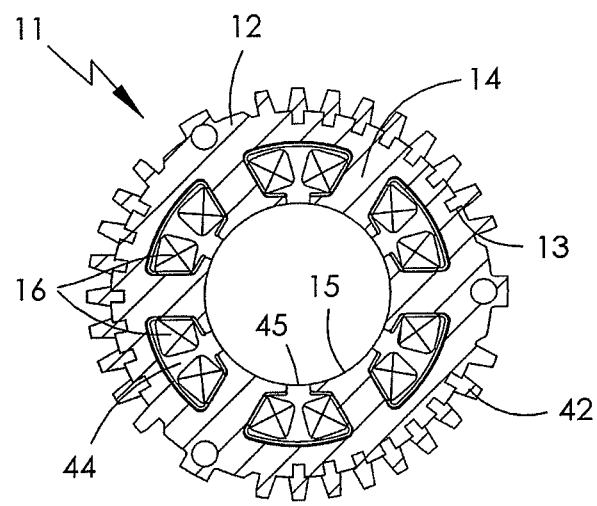
FIG. 5 is a cross-sectional view of the stator of FIG. 4.

The stator 11, as more clearly shown in FIGS. 4 & 5, comprises an annular yoke portion 12, a plurality of stator teeth 14 inwardly extending from the yoke portion 12, a plurality of stator windings 16 wound about the stator teeth 14, and a molded member 40 made of an electrically insulative, heat conductive, plastic material. A plurality of axial recesses 13 are formed in an outer wall of the yoke portion 12. The surface of each stator tooth 14 that faces the rotor 20 is arc-shape. The molded member 40 comprises a plurality of fins 42, a covering portion 44 and two connecting portions 46. The fins 42 are strip-shaped. The fins 42 are arranged on the outer wall of the yoke portion 12 in such a way that, radially inner portions of the fins 42 are received in the recesses 13 to increase contact surface area with the yoke portion 12, and radially outer portions of the fins 42 are exposed outside of the yoke portion 12 to facilitate heat dissipation. The covering portion 44 is disposed in the spaces between adjacent stator teeth 14, and covers the inner wall of the yoke portion 12, side walls of the stator teeth 14 and the stator windings 16. The surfaces 15 of the stator teeth 14 that face the rotor 20 are not covered by the covering portion 44. The radially inner surface 45 of the covering portion 44 and the surfaces 15 of the stator teeth 14 are in smooth connection, and form a circular cylindrical surface defining a space accommodating the rotor 20. The two connecting portions 46 are respectively provided at two axial end faces of the stator yoke portion 12 that are perpendicular to the axis of the stator which is coaxial with the axis of the motor. The radially outer surface of the connecting portions 46 connect with the fins 42. The surfaces of the connecting portions 46 that face each other are connected to the covering portion 44. Terminals 17 of the stator windings 16 pass through the molded member 40 and extend to outside of the outer wall of the yoke portion 12.

In the present embodiment, the fins 42, covering portion 44 and the connecting portions 46 are integrally formed as one piece, monolithic molded structure and bonded with the stator core and stator windings. However, it should be understood that the invention is not limited to this configuration.

In the present embodiment, the connecting portions 46 are substantially ring-shaped and cover the whole end faces of the yoke portions 12 and the teeth 14 to facilitate heat dissipation. However, it should be understood that the invention is not limited to this configuration.

In the way aforesaid, heat generated by the stator windings 16 are transmitted to the yoke portion 12 and fins 42 via the stator teeth 14 and then dissipated. The heat is also transmitted to the connecting portion 46 and the fins 42 via the covering portion 44 and then dissipated. In addition, a part of the heat could be dissipated via the radially inner surface 45 of the covering portion 44. As such, the molded member 40 significantly improves the heat dissipation capacity of the stator 11.

It should be understood that, even if the yoke portion 12 doesn't have any recesses 13, heat may be transferred from the yoke portion to the fins by direct contact between the yoke portion and the fins. In this case, the fins 42 are attached at outer wall of the yoke portion 12, without the aid of recesses.

Figure 3:
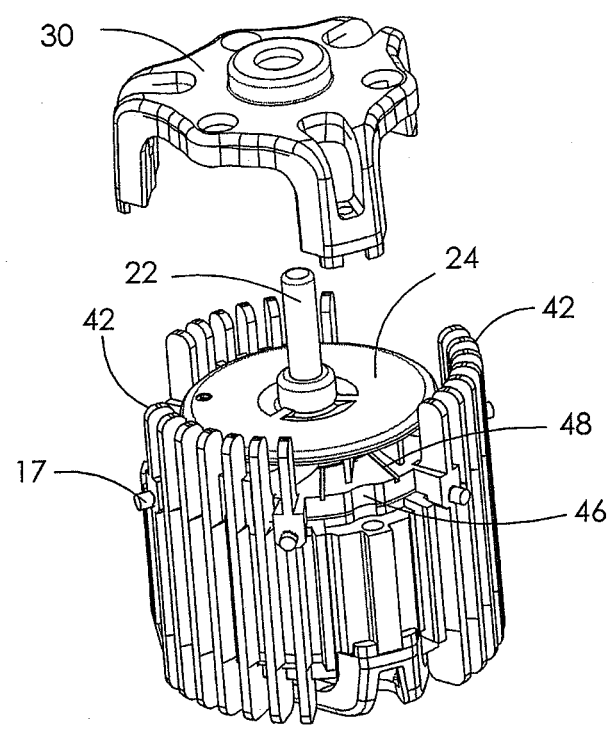
FIG. 3 is a partially exploded view of the motor of FIG. 1, viewed from below.
Figure 2:
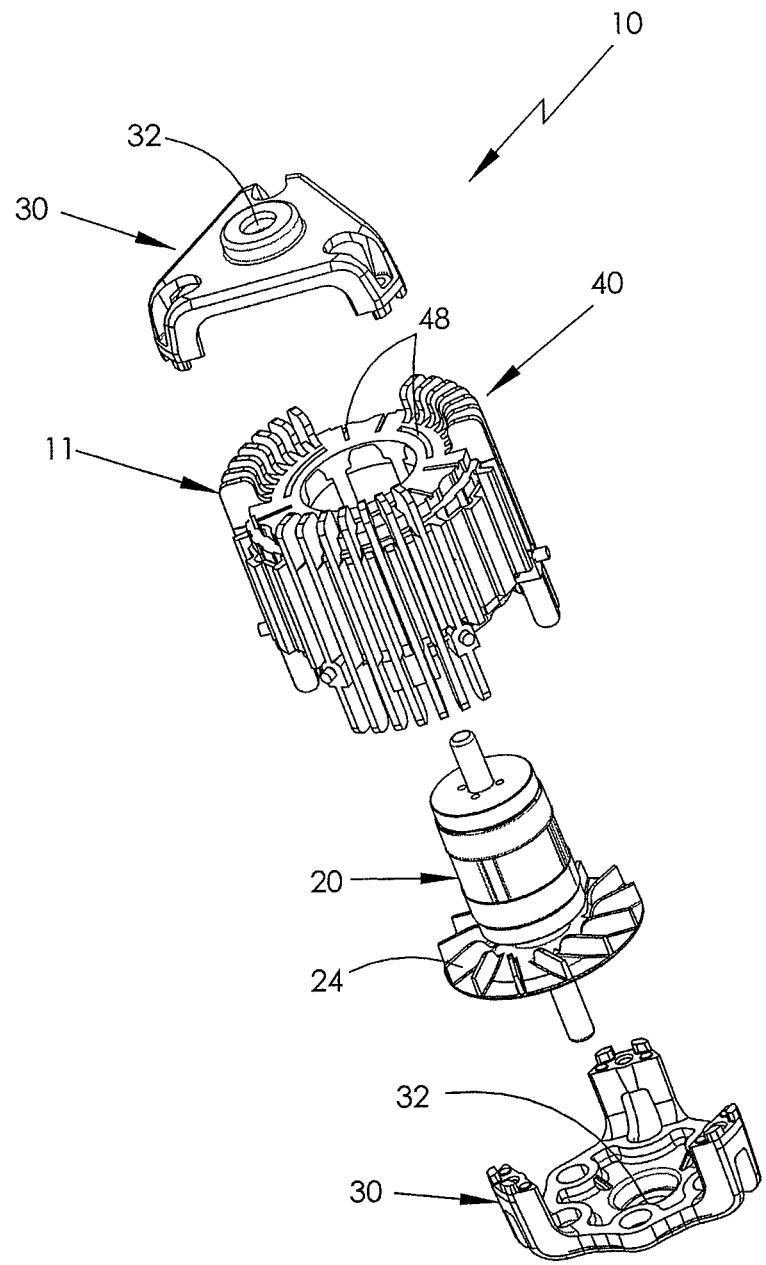
FIG. 2 is an exploded view of the motor of FIG. 1.

Preferably, as shown in FIG. 3, the axial length of each fin 42 is greater than the distance between the two connecting portions 46. That is the fins may extend beyond one or both connecting portions. Preferably, the two ends of each fin 42 are respectively aligned with the axially outer ends of the two end caps 30. In this configuration, the heat dissipation capacity is further enhanced without increasing the axial length of the motor 10.

Preferably, the motor 10 comprises an impeller 24 that is fixed to the shaft 22. The impeller 24 is located between one of the two end caps 30 and one of the two connecting portions 46 covering an end face of the stator 11, and surrounded by the sections of the fins 42 that extend beyond the connecting portion. As such, when the motor is running, the impeller 24 creates air flow over the fins 42 to dissipate heat.

Preferably, the axially outer end surfaces of the two connecting portions have a plurality of grooves 48 to increase the contact surface area between the connecting portion 46 and the air. The grooves 48 may extend circumferentially, radially or in other directions.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. A motor, comprising:
   a stator;
   a shaft;
   a rotor received in the stator, the stator comprising:
      an annular yoke portion;
      a plurality of stator teeth inwardly extending from the yoke portion;
      stator windings wound on the stator teeth; and
      a molded member made of heat conductive plastic material, the molded member comprising:
         a plurality of fins arranged on an outer wall of the yoke portion;
         a covering portion disposed in spaces between adjacent stator teeth and covering the stator windings; and
         two connecting portions respectively located at two axial end faces of the yoke portion and connected to the covering portion and the fins, the plurality of fins being connected together via the two connecting portions at two axial ends; and
   two end caps fixed to the stator, each and cap including extending portions positioned between the plurality of fins,
   wherein a plurality of axially extending recesses is formed on a radially outer wall of the yoke portion; and each fin is axially arranged on the radially outer wall of the yoke portion and a radially inner portion of each fin is received in a corresponding said recess, each recess receives only one radially inner portion of a corresponding fin, and
   wherein each tooth has a radially inner surface that is uncovered by the covering portion, faces the rotor and is arc shaped, the arc-shape inner surfaces of the stator teeth and radially inner surfaces of the covering portions forming a smooth circular cylindrical surface that defines a space accommodating the rotor.

2. The motor of claim 1, wherein each connecting portion is ring shaped and completely covers the corresponding end face.

3. The motor of claim 1, wherein each fin extends in the axial direction of the motor, and extends beyond at least one of the two connecting portions.

4. The motor of claim 1, wherein grooves are formed in axially outer surfaces of the two connecting portions.

5. The motor of claim 1, wherein the molded member is integrally formed as a single piece, monolithic, injection molding structure.

6. The motor of claim 1, further comprising an impeller fixed to the shaft and facing one connecting portion of the molded member, and the fins extend passed said one connecting portion and radially surround the impeller which creates air flow over the fins to directly dissipate heat to outside of the motor.

7. The motor of claim 6, wherein the impeller is located between said one connecting portion and the end cap.

8. The motor of claim 6, further comprising two end caps fixed to the stator; and
the shaft is journalled in bearings supported by the two end caps.

9. The motor of claim 1, wherein the inner surface of each tooth is a flat arc-shaped surface without any grooves being defined thereof.

10. A stator for an electric motor, comprising:
an annular yoke portion;
a plurality of stator teeth inwardly extending from the yoke portion;
stator windings wound on the stator teeth;
an injection molded member made of electrically insulating, heat conductive plastic material, the molded member comprising:
a plurality of fins arranged on an outer wall of the yoke portion;
a covering portion disposed in spaces between adjacent stator teeth and covering the stator windings; and
two connecting portions located at respective axially outer end faces of the yoke portion, and connected to the covering portion and the fins, the plurality of fins being connected together via the two connecting portions at two axial ends; and
two end caps fixed to the stator, each end cap including extending portions positioned between the plurality of fins,
wherein a plurality of axially extending recesses are formed on a radially outer wall of the yoke portion; and each fin is axially arranged on the radially outer wall of the yoke portion, and a radially inner portion of each fin is received in a corresponding recess, each recess receives only one radially inner portion of a corresponding fin, and
wherein each tooth has a radially inner surface that is uncovered by the covering portion and is arc shaped, the arc-shape inner surfaces of the stator teeth and radially inner surfaces of the covering portions forming a smooth circular cylindrical surface that defines a space.

11. The stator of claim 10, wherein each connecting portion is ring shaped and completely covers the corresponding end face.

12. The stator of claim 10, wherein each fin extends in the axial direction of the motor, and extends beyond at least one of the two connecting portions.

13. The stator of claim 10, wherein grooves are formed in axially outer surfaces of the two connecting portions.

14. The stator of claim 10, wherein the molded member is integrally formed as a single piece, monolithic structure.

15. The stator of claim 10, wherein the inner surface of each tooth is a flat arc-shaped surface without any grooves being defined thereof.

16. A motor, comprising:
a stator;
a shaft;
a rotor received in the stator, the stator comprising:
an annular yoke portion;
a plurality of stator teeth inwardly extending from the yoke portion;
stator windings wound on the stator teeth; and
a molded member made of heat conductive plastic material, the molded member comprising:
a plurality of fins arranged on an outer wall of the yoke portion;
a covering portion disposed in spaces between adjacent stator teeth and covering the stator windings; and
two connecting portions respectively located at two axial end faces of the yoke portion and connected to the covering portion and the fins, and
two end caps fixed to the stator, each end cap including extending portions positioned between the plurality of fins,
wherein each tooth has a radially arc-shaped inner surface that is uncovered by the covering portion and faces the rotor, the arc-shaped inner surfaces of the stator teeth and radially inner surfaces of the covering portions forming a smooth circular cylindrical surface that defines a space accommodating the rotor.

17. The motor of claim 16, wherein the inner surface of each tooth is a flat arc-shaped surface without any grooves being defined thereof.

* * * * *